US009111443B2

(12) United States Patent
Lynar et al.

(10) Patent No.: US 9,111,443 B2
(45) Date of Patent: Aug. 18, 2015

(54) HEAVY VEHICLE TRAFFIC FLOW OPTIMIZATION

(75) Inventors: Timothy M. Lynar, Carlton Vic (AU); Kent C. Steer, Carlton Vic (AU)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 13/306,015

(22) Filed: Nov. 29, 2011

(65) Prior Publication Data

US 2013/0138331 A1 May 30, 2013

(51) Int. Cl.

| | |
|---|---|
| ***G06F 19/00*** | (2011.01) |
| ***G06G 7/70*** | (2006.01) |
| ***G08G 1/01*** | (2006.01) |
| ***G08G 1/04*** | (2006.01) |
| ***G08G 1/042*** | (2006.01) |
| ***G08G 1/07*** | (2006.01) |
| ***G08G 1/081*** | (2006.01) |
| ***G08G 1/00*** | (2006.01) |

(52) U.S. Cl.

CPC ............ *G08G 1/0112* (2013.01); *G08G 1/0133* (2013.01); *G08G 1/0145* (2013.01); *G08G 1/04* (2013.01); *G08G 1/042* (2013.01); *G08G 1/07* (2013.01); *G08G 1/081* (2013.01); *G08G 1/20* (2013.01)

(58) Field of Classification Search

CPC ................................. G08G 1/00; G08G 1/095

USPC .......................................... 701/117, 118, 119

See application file for complete search history.

(56) References Cited

U.S. PATENT DOCUMENTS

| | | | | |
|---|---|---|---|---|
| 4,973,219 | A * | 11/1990 | Brickner et al. | 414/792.9 |
| 5,535,314 | A * | 7/1996 | Alves et al. | 382/165 |
| 5,745,865 | A * | 4/1998 | Rostoker et al. | 455/456.5 |
| 6,539,300 | B2 | 3/2003 | Myr | |
| 7,969,324 | B2 * | 6/2011 | Chevion et al. | 340/901 |
| 2002/0115423 | A1 * | 8/2002 | Hatae et al. | 455/404 |
| 2003/0014286 | A1 * | 1/2003 | Cappellini | 705/5 |
| 2005/0068198 | A1 * | 3/2005 | Brega et al. | 340/933 |
| 2005/0267651 | A1 * | 12/2005 | Arango et al. | 701/3 |
| 2006/0036378 | A1 * | 2/2006 | Smith et al. | 702/57 |
| 2009/0174576 | A1 * | 7/2009 | Allen et al. | 340/941 |
| 2012/0173171 | A1 * | 7/2012 | Bajwa et al. | 702/56 |

FOREIGN PATENT DOCUMENTS

JP 2000048297 A * 2/2000

* cited by examiner

*Primary Examiner* — Behrang Badii
*Assistant Examiner* — Daniel L Greene
(74) *Attorney, Agent, or Firm* — Tutunjian & Bitetto, P.C.; Vazken Alexanian

(57) ABSTRACT

There is provided a method for heavy vehicle traffic flow optimization. The method includes determining location information and destination information of qualifying heavy vehicles. The method further includes modifying one or more traffic signal sequences to optimize a traffic flow of the qualifying heavy vehicles responsive to the location information and the destination information. Each of the qualifying heavy vehicles has a respective associated weight greater than a predetermined weight threshold.

24 Claims, 3 Drawing Sheets

HEAVY VEHICLE TRAFFIC FLOW OPTIMIZATION

BACKGROUND

1. Technical Field

The present invention relates generally to vehicles and, in particular, to heavy vehicle traffic flow optimization.

2. Description of the Related Art

Repairing roads costs hundreds of millions of dollars every year. The vast majority of the damage done to roads is due to a relatively small number of heavy vehicles. The two factors which affect the impact of a vehicle are the weight on each axle and the amount of time the vehicle spends on any given segment of road.

Present efforts to reduce this impact focus on the road surface, maintenance schedules and the per axle load of vehicles. Roads can be strengthened. Maintenance can be scheduled more frequently to prevent amplified failure rates. Further, vehicles can be modified in a number of ways to reduce the impact on the road. All of these approaches can have a positive effect. However, they miss a large opportunity to do even more.

SUMMARY

According to an aspect of the present principles, there is provided a method for heavy vehicle traffic flow optimization. The method includes determining location information and destination information of qualifying heavy vehicles. The method further includes modifying one or more traffic signal sequences to optimize a traffic flow of the qualifying heavy vehicles responsive to the location information and the destination information. Each of the qualifying heavy vehicles has a respective associated weight greater than a predetermined weight threshold.

According to another aspect of the present principles, there is provided a computer readable storage medium comprising a computer readable program. The computer readable program when executed on a computer causes the computer to perform the following: receive location information and destination information of qualifying heavy vehicles; and modify one or more traffic signal sequences to optimize a traffic flow of the qualifying heavy vehicles responsive to the location information and the destination information. Each of the qualifying heavy vehicles has a respective associated weight greater than a predetermined weight threshold.

According to yet another aspect of the present principles, there is provided a system having at least a processor and a memory device for implementing a method for heavy vehicle traffic flow optimization. The system includes a receiver for receiving location information and destination information of qualifying heavy vehicles. The system further includes a controller, operatively coupled to the receiver, for modifying one or more traffic signal sequences to optimize a traffic flow of the qualifying heavy vehicles responsive to the location information and the destination information. Each of the qualifying heavy vehicles has a respective associated weight greater than a predetermined weight threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to heavy vehicle traffic flow optimization. In a preferred embodiment, the present principles are particularly directed to the problem of extending pavement life. Of course, this and other exemplary situations and problems to which the present principles can be applied are readily determined by one of ordinary skill in this and related arts, given the teachings of the present principles provided herein.

In an embodiment, the impact of heavy vehicles on the road can be reduced by modifying traffic signals such that the flow of these vehicles is optimized. That is, vehicle flow is optimized in the sense that vehicle velocity and changes in vehicle velocity are prioritized such that the damage to the road and the cost of maintaining the road are minimized. This will reduce the total impact of such heavy vehicles on the road.

The present principles utilize a system and/or method that are aware of the location and destination of qualifying heavy vehicles. This location and destination information is used to modify traffic signal sequences such that the flow of the heavy vehicles is optimized. This includes the clearing of paths for such vehicles.

The data upon which signal sequence modifications are determined can be detected and inferred or can be explicitly provided by vehicles. In the former case (i.e., detected and inferred), there is a possibility of re-purposing existing systems (e.g., induction loops and street level cameras). In the latter case (i.e., explicitly provided), vehicles would be fitted with a device which transmits their present location. Route information could come from vehicles, from the fleet coordinator, or through statistical means. Advantageously, the present principles can be used in place of existing approaches or together with one or more existing approaches.

Figure 1:
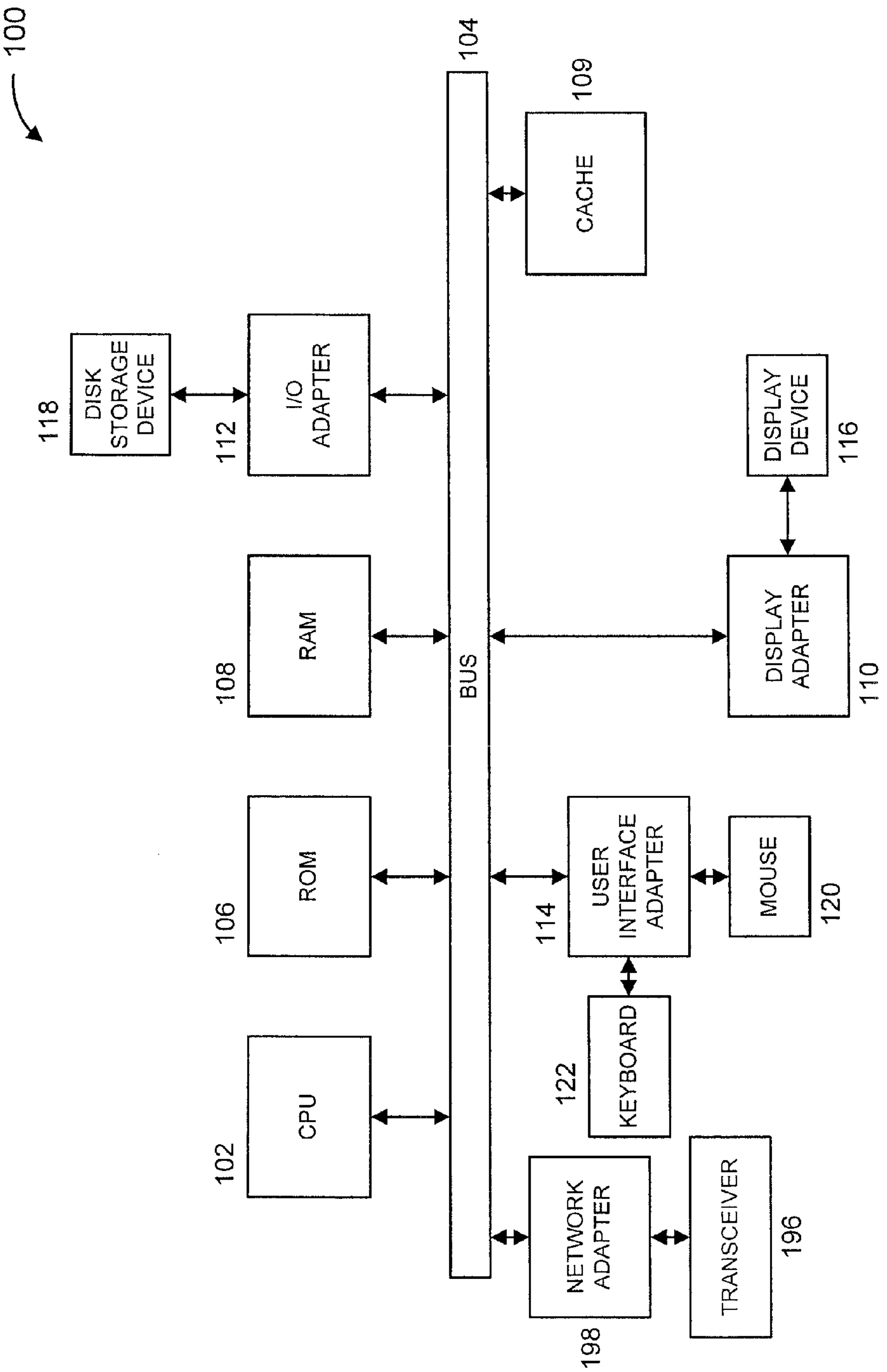
FIG. 1 is a block diagram showing an exemplary processing system 100 to which the present invention may be applied, in accordance with an embodiment of the present invention.

FIG. 1 shows an exemplary processing system 100 to which the present invention may be applied, in accordance with an embodiment of the present invention. The processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

A transceiver 196 is operatively coupled to system bus 104 by network adapter 198.

Figure 2:
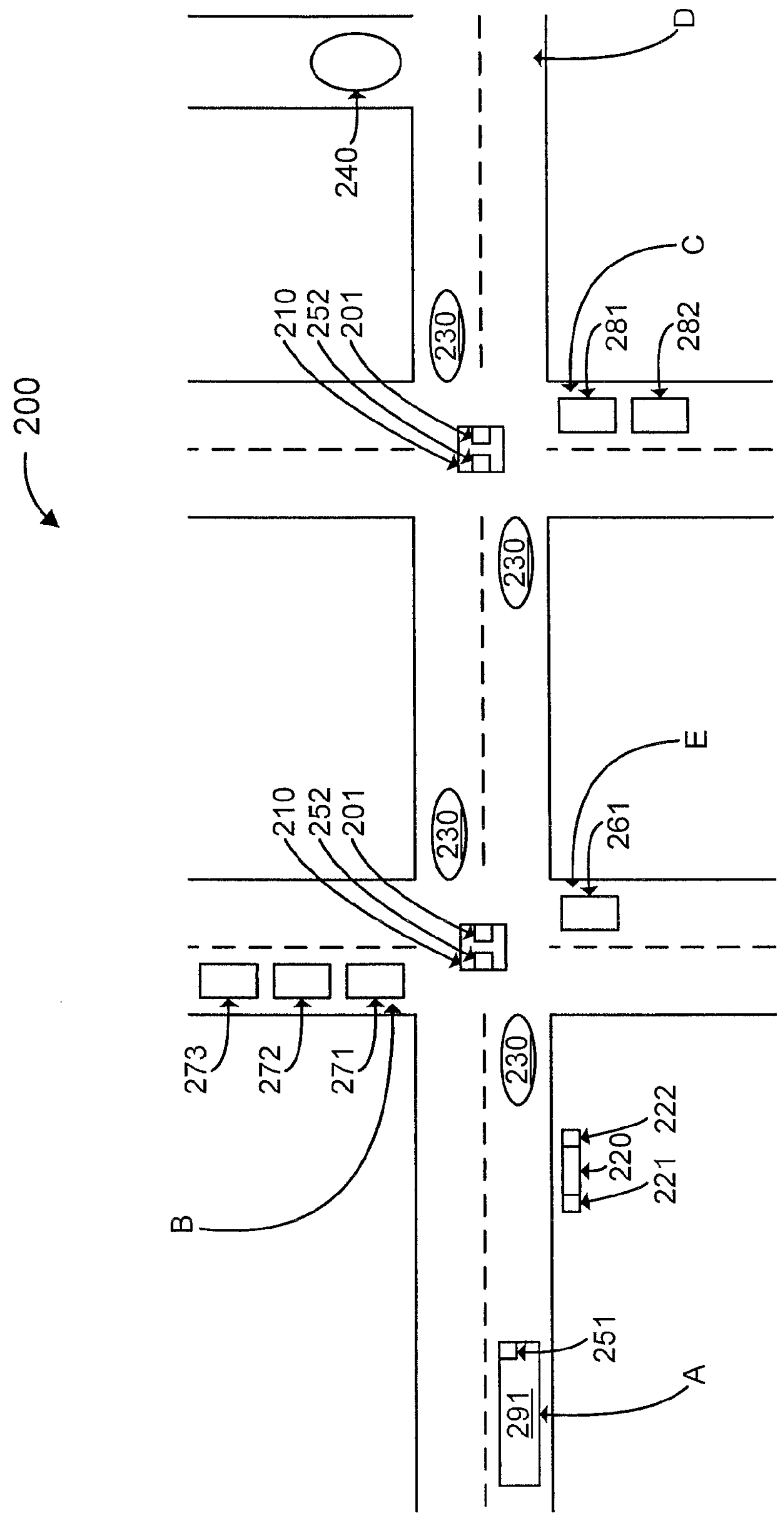
FIG. 2 is a block diagram showing an exemplary system 200 for extending pavement life through heavy vehicle flow optimization, in accordance with an embodiment of the present principles.

Of course, the processing system 100 may also include other elements (not shown), as readily contemplated by one of skill in the art, as well as omit certain elements. For example, system 200 described below with respect to FIG. 2 is a system for implementing an embodiment of the present principles. Part or all of processing system 100 may be implemented in one or more of the elements of system 200. In such a case, the transceiver 196 may be replaced by a transmitter or receiver depending upon the element the processing system 200 or portion thereof is implemented in, connected to, and or otherwise somehow involved with, as readily contemplated and understood by one of ordinary skill in the art, given the teachings of the present principles provided herein. Thus, when used herein, the term "transceiver" may be replaced by "transmitter" or "receiver" depending on the specific implementation.

Additionally, elements of processing system 100 such as the keyboard 122 and mouse 120 may be omitted with a user interfacing with the processing system 100 remotely via the transceiver 196. For example, a processing system 100 implemented at a traffic signal may omit such elements, with an traffic signal technician providing his or her own means of interfacing with the same when the technician is located at the traffic signal, or may access the processing system remotely as noted above.

These and other variations of processing system 100 and the elements included therein are readily contemplated by one of ordinary skill in the art, while maintaining the spirit of the present principles.

Moreover, it is to be appreciated that processing system 100 may perform method 300 described below in conjunction with FIG. 3.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

FIG. 2 shows an exemplary system 200 for extending pavement life through heavy vehicle flow optimization, in accordance with an embodiment of the present principles. The system 200 is implemented on a roadway where cars travel on the right side. Of course, the present principles may also be implemented on roadways where cars travel on the left side.

The system 200 includes and/or otherwise involves traffic signals 210, roadside cameras 220, induction loops 230, vehicle weight measuring devices 240, and wireless transceivers 251 and 252. The wireless transceivers 251 are located on qualifying heavy vehicles, i.e., vehicles having an expected weight (such as axle weight) greater than a threshold weight. The wireless transceivers 252 are located at traffic signals 210 and are configured to be responsive to, e.g., the wireless transceivers 251.

The cameras 220 and induction loops 230 may communicate with the traffic signals 210 wirelessly (for example, by including their own transmitters or transceivers) or by wires (e.g., existing wires or newly laid wires). While shown, for example, on certain sides on intersections for the sake of brevity, the cameras 220 and induction loops 230 may be positioned at any sides.

The traffic signals 210 include a controller (e.g., a processor) 201 for controlling and modifying the operation of the traffic signals (e.g., the phases thereof). The transceiver 251 is operatively coupled to the controller 201.

The system 200 is shown with respect to locations indicated by the letters A, B, C, and D. The truck, hereinafter, qualifying heavy vehicle, 291 at location A is trying to get to location D. The cars 271, 272, and 273 at location B, the cars 281 and 282 at location C, and the car 261 at location E are made to wait a little longer or stop a little earlier (than otherwise, had the present principles not been implemented) so that the qualifying heavy vehicle 291 does not have to stop and can simply go through the intersection at location B.

The vehicle weight measuring devices 240 may be located at traffic intersections or other locations at which vehicles are expected to maintain stationary for a sufficient period of time in order to determine the weight of such vehicles. In view of the indeterminate length problem (i.e., the "scale" has to only be responsive to one vehicle, which is very hard to implement at a traffic light in view of the various vehicle lengths thereat) that is likely violated at traffic intersections, other locations such as, for example, weighing stations are preferred, with the resultant determined weight being used in some way by the system. For example, the weight may be transmitted by the wireless transceiver 251 in the qualifying heavy vehicle 291 (or from a wireless transceiver (not shown) at the vehicle weight measuring device itself) to the wireless transceivers 252 at the traffic signals 210 for use thereby as described in further detail herein. Of course, wires may also be used by the weight measuring devices 240 to communicate the weights to the traffic signals 210. FIG. 2 shows a vehicle weight measuring device 240 on a one way street, which can be designated, for example, as a truck weighing point.

The cameras 220 may be used, for example, to read the indicia on vehicles indicative of heavy weight (i.e., weight above a given threshold, which would represent the fact that the vehicle under observation is a qualifying heavy vehicle), or may simply gauge the same responsive to the overall dimensions of a given vehicle currently under observation. As such, the cameras 220 may include and/or otherwise be connected to weight evaluating circuitry 221 that can be used to determine and/or guess the weight associated with a given vehicle. Such weight evaluating circuitry 221 may include and/or otherwise interface with a database 222 that includes pictures and/or other representations of vehicles with weight data associated therewith, for example, using an index. Such weight data may include, for example, the maximum allowable axle weight for a given vehicle or given class of vehicle, and so forth. In implementations involving processing system 100 or a variation thereof, the database 222 may be implemented with respect to, for example, disk storage device 118.

We will now describe a particular detailed embodiment of the present principles for the sake of illustration. However, it is to be appreciated that the present principles are not limited solely to the following embodiment and, thus, other embodiments, as well as variations of the following embodiment, may also be utilized in accordance with the teachings of the present principles, while maintaining the spirit of the present principles.

Let us assume all traffic light sequences follow a fixed routine throughout each day (for the sake of simplicity in this example, we will ignore interrupts, such as those caused when a pedestrian wishes to cross).

A daily routine includes light phases. For example, phase one might have a north-south road seeing a red signal while the east-west road receives a green.

A day can be viewed as a series of phases: 1, 2 . . . , i, . . . N.

Let $t_i$ be the time at which the i-th phase begins under normal operating conditions (i.e., no augmentation in accordance with the present principles).

Let $u_i$ be the time at which the i-th phase begins under augmented operating conditions (i.e., augmented in accordance with an embodiment of the present principles).

Let us introduce a variable $a_i$ which represents an augmentation to the duration of the i-th phase.

We can then define the following constraint for the time at which phase i begins:

$$u_i = t_i + a_{i-1} \tag{1}$$

Let $u = \{u_1, u_2, \ldots, u_N\}$.

Let us use the index l to denote the intersection such that $u_l$ is the set of phase timings for the l-th intersection.

Let $\mathcal{U}$ be the set of timings: for all intersections.

Let $x_j(t)$ be the position of the j-th vehicle; a continuous function of time.

Let $\dot{x}_j(t)$ be the velocity of the j-th vehicle; a continuous function of time.

Let $\ddot{x}_j(t)$ be the acceleration of the j-th vehicle; a continuous function of time.

The damage incurred by road segment k due to vehicle j is a function of the vehicle's mass $m_j$, position, velocity and acceleration:

$$D_{jk} = \phi(m_j, x_j(t), \dot{x}_j(t), \ddot{x}_j(t)). \tag{2}$$

We constrain the total damage to any one section:

$$\sum_j D_{jk} < D_{max} \forall k \tag{3}$$

Let $\mathfrak{R}_j$ be the route information for vehicle j.

We also note that vehicle driving patterns depend on the following traffic light phases:

$$x_j(t) = f(\mathcal{U}, \mathfrak{R}_j) \tag{4}$$

$$\dot{x}_j(t) = g(\mathcal{U}, \mathfrak{R}_j) \tag{5}$$

$$\ddot{x}_j(t) = h(\mathcal{U}, \mathfrak{R}_j) \tag{6}$$

where $f(\cdot)$, $g(\cdot)$, and $h(\cdot)$ are functions. Such functions $f(\cdot)$, $g(\cdot)$, and $h(\cdot)$ may be determined in consideration of position, velocity, and acceleration as their respective roles in affecting pavement life.

We minimize the total damage as follows:

$$\min z = \sum_j \sum_k D_{jk} \tag{7}$$

Equation (7) could be solved using any of the following meta-heuristic algorithms: Genetic Algorithm (GA); Particles Swarm Optimization (PSO); and Covariance Matrix Adaptation Evolutionary Strategy (CMA-ES). Alternatively, an Integer Programming approach could be used.

Figure 3:
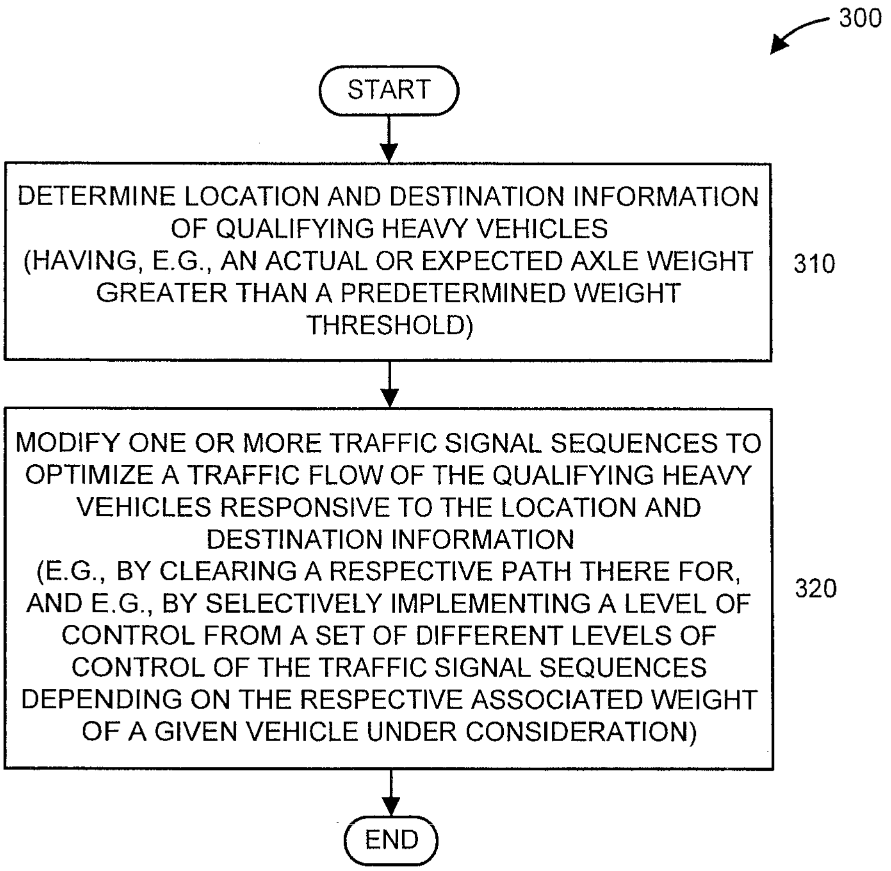
FIG. 3 is a flow diagram showing an exemplary method 300 for extending pavement life through heavy vehicle flow optimization, in accordance with an embodiment of the present principles.

FIG. 3 shows an exemplary method 300 for extending pavement life through heavy vehicle flow optimization, in accordance with an embodiment of the present principles. At step 310, location and destination information of qualifying heavy vehicles is determined (e.g., by inference and/or by being explicitly provided). Each of the qualifying heavy vehicles has a respective associated weight greater than a predetermined weight threshold. In an embodiment, the associated weight of a given one of the qualifying heavy vehicles is an axle weight of the given one of the qualifying heavy vehicles. The axle weight can be an actual axle weight or an expected axle weight.

At step 320, traffic signal sequences are modified to optimize a traffic flow of the qualifying heavy vehicles responsive to the location and destination information. In an embodiment, it is to be appreciated that step 320 may involve, for example, clearing a respective path for a qualifying heavy vehicle. Accordingly, clearing such a path may involve, for example, making cars at a traffic intersection to be passed by the qualifying heavy vehicle wait longer or stop earlier so that the qualifying heavy vehicle does not have to stop at the traffic intersection and can simply proceed unimpeded through the intersection. In an embodiment, "unimpeded" refers to the situation where the intention of the system is for the qualifying heavy vehicle to maintain a current speed, i.e., minimal breaking and acceleration, as wear is then maximally minimized.

In an embodiment, step 320, may involve, with respect to the modifying of the traffic signal sequences, selectively implementation one of a set of different levels of control to the traffic signal sequences depending on the respective associated weight of a given one of the qualifying heavy vehicles currently under consideration. That is, heavier ones of the qualifying heavy vehicles, as based on a different weights or weight ranges, are afforded a greater degree of freedom of travel (i.e., less impedance) than lighter ones of the qualifying heavy vehicles. This is because vehicle actions such as, for example, braking, accelerating, turning, and so forth, place a greater degree of damage on a given road segment than simply proceeding on the same at a constant rate of speed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for heavy vehicle traffic flow optimization, comprising:

reading, from vehicles using cameras, indicia on the vehicles indicative of the vehicles being qualifying heavy vehicles;

predicting whether respective weights of the vehicles are indicative of the vehicles being the qualifying heavy vehicles based on observed overall dimensions of the vehicles from images captured by the cameras;

determining location information and destination information of the qualifying heavy vehicles; and modifying one or more traffic signal sequences to optimize a traffic flow of the qualifying heavy vehicles responsive to the location information and the destination information, wherein each of the qualifying heavy vehicles has a respective associated weight greater than a predetermined weight threshold, and wherein the one or more traffic signal sequences are modified to optimize the traffic flow of the qualifying heavy vehicles while minimizing a total pavement damage caused by the qualifying heavy vehicles using a minimization function that considers a vehicle position, a vehicle velocity, and a vehicle acceleration.

2. The method of claim 1, wherein the associated weight of a given one of the qualifying heavy vehicles is an axle weight of the given one of the qualifying heavy vehicles.

3. The method of claim 1, wherein the axle weight is an actual axle weight or an expected axle weight.

4. The method of claim 1, wherein at least one of the location information and the destination information is inferred.

5. The method of claim 1, wherein at least one of the location information and the destination information is explicitly provided by the qualifying heavy vehicles.

6. The method of claim 1, wherein at least one of the location information and the destination information is provided using a combination of inferred information for some of the qualifying heavy vehicles and explicitly provided information for other ones of the qualifying heavy vehicles.

7. The method of claim 1, wherein the destination information is provided from statistics.

8. The method of claim 1, wherein said modifying step selectively implements one of a plurality of different levels of control to the traffic signal sequences depending on the respective associated weight of a given one of the qualifying heavy vehicles currently under consideration.

9. The method of claim 1, wherein heavier ones of the qualifying heavy vehicles, as based on a different weights or weight ranges, are afforded a greater degree of freedom of travel than lighter ones of the qualifying heavy vehicles.

10. The method of claim 1, wherein said predicting step compares the overall dimensions to vehicle pictures stored in a database, the vehicle pictures having weight data associated therewith.

11. The method of claim 1, wherein said modifying step comprises the step of clearing a respective path for one or more of the qualifying heavy vehicles.

12. The method of claim 11, wherein said step of clearing a respective path comprises making cars at a traffic intersection to be passed by the one or more qualifying heavy vehicles wait longer or stop earlier so that the one or more qualifying heavy vehicles do not have to stop at the traffic intersection and can simply proceed unimpeded through the intersection.

13. The method of claim 1, wherein the location information is provided using the cameras disposed along a route of one or more of the qualifying heavy vehicles.

14. The method of claim 13, further comprising repurposing the cameras from another intended use.

15. The method of claim 1, wherein the location information is provided using induction loops disposed along a route of one or more of the qualifying heavy vehicles.

16. The method of claim 15, further comprising repurposing the induction loops from another intended use.

17. A non-transitory computer readable storage medium comprising a computer readable program, wherein the computer readable program when executed on a computer causes the computer to perform the following:

read, from vehicles using cameras, indicia on the vehicles indicative of the vehicles being qualifying heavy vehicles;

predict whether respective weights of the vehicles are indicative of the vehicles being the qualifying heavy vehicles based on observed overall dimensions of the vehicles from images captured by the cameras;

receive location information and destination information of the qualifying heavy vehicles; and modify one or more traffic signal sequences to optimize a traffic flow of the qualifying heavy vehicles responsive to the location information and the destination information, wherein each of the qualifying heavy vehicles has a respective associated weight greater than a predetermined weight threshold, and wherein the one or more traffic signal sequences are modified to optimize the traffic flow of the qualifying heavy vehicles while minimizing a total pavement damage caused by the qualifying heavy vehicles using a minimization function that considers a vehicle position, a vehicle velocity, and a vehicle acceleration.

18. A system having at least a processor and a memory device for implementing a method for heavy vehicle traffic flow optimization, comprising:

cameras for reading from vehicles indicia on the vehicles indicative of the vehicles being qualifying heavy vehicles, and for capturing images that include observed overall dimensions of the vehicles;

weight evaluating circuitry for predicting respective weights of the vehicles indicative of the vehicles being qualifying heavy vehicles based on the observed overall dimensions of the vehicles from the images captured by the cameras;

a receiver for receiving location information and destination information of the qualifying heavy vehicles; and a controller, operatively coupled to the receiver, for modifying one or more traffic signal sequences to optimize a traffic flow of the qualifying heavy vehicles responsive to the location information and the destination information, wherein each of the qualifying heavy vehicles has a respective associated weight greater than a predetermined weight threshold, and wherein the one or more traffic signal sequences are modified to optimize the traffic flow of the qualifying heavy vehicles while minimizing a total pavement damage caused by the qualifying heavy vehicles using a minimization function that considers a vehicle position, a vehicle velocity, and a vehicle acceleration.

19. The system of claim 18, wherein the cameras are disposed along a route of one or more of the qualifying heavy vehicles for providing the location information.

20. The system of claim 18, further comprising induction loops disposed along a route of one or more of the qualifying heavy vehicles for providing the location information.

21. The system of claim 18, wherein said modifying step comprises the step of clearing a respective path for one or more of the qualifying heavy vehicles.

22. The system of claim 21, wherein said step of clearing a respective path comprises making cars at a traffic intersection to be passed by the one or more qualifying heavy vehicles wait longer or stop earlier so that the one or more qualifying heavy vehicles do not have to stop at the traffic intersection and can simply proceed unimpeded through the intersection.

23. The system of claim 18, wherein said controller selectively implements one of a plurality of different levels of control to the traffic signal sequences depending on the respective associated weight of a given one of the qualifying heavy vehicles currently under consideration.

24. The system of claim 23, wherein heavier ones of the qualifying heavy vehicles, as based on a different weights or weight ranges, are afforded a greater degree of freedom of travel than lighter ones of the qualifying heavy vehicles.

* * * * *